US010302298B2

(12) United States Patent
Ilchenko et al.

(10) Patent No.: US 10,302,298 B2
(45) Date of Patent: May 28, 2019

(54) EVAPORATOR BURNER ARRANGEMENT FOR A MOBILE HEATER OPERATED WITH LIQUID FUEL

(71) Applicant: WEBASTO SE, Stockdorf (DE)

(72) Inventors: Volodymyr Ilchenko, Stockdorf (DE); Martin Zoske, Stockdorf (DE); Michael Poehner, Stockdorf (DE); Vitali Dell, Stockdorf (DE); Klaus Moesl, Stockdorf (DE); Stefan Sommerer, Stockdorf (DE); Thomas Kerscher, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 127 days.

(21) Appl. No.: 15/127,306

(22) PCT Filed: Mar. 11, 2015

(86) PCT No.: PCT/DE2015/100100
§ 371 (c)(1),
(2) Date: Sep. 19, 2016

(87) PCT Pub. No.: WO2015/139684
PCT Pub. Date: Sep. 24, 2015

(65) Prior Publication Data
US 2018/0172268 A1 Jun. 21, 2018

(30) Foreign Application Priority Data

Mar. 20, 2014 (DE) ........................ 10 2014 103 813

(51) Int. Cl.
*B60H 1/22* (2006.01)
*F23D 3/40* (2006.01)
(Continued)

(52) U.S. Cl.
CPC ............. *F23D 3/40* (2013.01); *B60H 1/2203* (2013.01); *F23C 7/004* (2013.01); *F23C 9/006* (2013.01);
(Continued)

(58) Field of Classification Search
CPC .. F23D 5/123; F23D 3/40; F23D 2900/05002; F23D 2900/14241;
(Continued)

(56) References Cited

U.S. PATENT DOCUMENTS 248,110 A * 10/1881 Park et al. ............. F23D 11/44
431/217
1,341,478 A 5/1920 Platt et al.
(Continued)

FOREIGN PATENT DOCUMENTS

CN 200989585 Y 12/2007
CN 101280922 A 10/2008
(Continued)

OTHER PUBLICATIONS

"DE_19529994_A1—Machine Translation.pdf", machine translation, EPO.org, Jun. 11, 2018.*
(Continued)

*Primary Examiner* — Gregory L Huson
*Assistant Examiner* — Daniel E Namay
(74) *Attorney, Agent, or Firm* — Quarles & Brady LLP (57) ABSTRACT

An evaporator burner arrangement (100) for a mobile heater operated with liquid fuel having: a mixture preparation region (2) for generating a fuel-air-mixture, a fuel evaporation surface (8) arranged in the mixture preparation region (2) for evaporating the liquid fuel, a combustion air supply (B) for supplying combustion air to the mixture preparation region (2), a fuel supply (1) for supplying liquid fuel to the fuel evaporation surface (8), a conversion region (3) being
(Continued)

arranged fluidically downstream of the mixture preparation region (2) for converting the fuel-air mixture in order to release heat, and a heat conductor body (7) extending spaced from a sidewall (25) of the mixture preparation region (2) through the mixture preparation region (2) to the conversion region (3) for feeding-back heat from the conversion region (3) to the mixture preparation region (2) by thermal conductance

14 Claims, 6 Drawing Sheets

(51) Int. Cl.
| | | |
|---|---|---|
| *F23D 5/12* | (2006.01) | |
| *F23C 7/00* | (2006.01) | |
| *F23C 9/00* | (2006.01) | |
| *B60H 1/03* | (2006.01) | |
| *F23D 5/18* | (2006.01) | |

(52) U.S. Cl.
CPC ...... *F23D 5/123* (2013.01); *B60H 2001/2271* (2013.01); *F23D 2900/05002* (2013.01); *F23D 2900/14241* (2013.01); *F23D 2900/21002* (2013.01)

(58) Field of Classification Search
CPC ............ F23D 2900/21002; F23C 7/004; F23C 9/006; B60H 1/2203; B60H 1/036; B60H 1/2209; B60H 2001/2271
USPC .................. 237/12.3 C; 431/11, 217, 242
See application file for complete search history.

(56) References Cited

U.S. PATENT DOCUMENTS

| | | | | |
|---|---|---|---|---|
| 1,604,003 | A * | 10/1926 | Ward ................... | F23D 5/02 431/330 |
| 2,373,757 | A * | 4/1945 | Hart ..................... | A01G 3/0251 237/12.3 C |
| 2,560,074 | A | 7/1951 | Bloomer | |
| 3,007,310 | A | 11/1961 | Eisele | |
| 3,502,268 | A * | 3/1970 | Miskulin ................. | B60H 1/20 237/12.3 C |
| 3,531,229 | A | 9/1970 | Berglund | |
| 3,592,577 | A * | 7/1971 | Kofink ..................... | F23C 99/00 165/104.26 |
| 4,004,875 | A | 1/1977 | Zink et al. | |
| 4,098,567 | A | 7/1978 | Hubbert | |
| 4,392,869 | A * | 7/1983 | Marion ................... | C01B 3/363 252/373 |
| 4,703,888 | A * | 11/1987 | Kawamura .......... | B60H 1/2203 126/110 C |
| 5,082,175 | A | 1/1992 | Koch et al. | |
| 5,090,896 | A * | 2/1992 | Kenner ................. | F23D 11/441 126/110 B |
| 5,350,293 | A | 9/1994 | Khinkis et al. | |
| 5,359,966 | A | 11/1994 | Jensen | |
| 5,616,021 | A | 4/1997 | Onimaru et al. | |
| 5,947,717 | A * | 9/1999 | Steiner ................. | B60H 1/2203 126/116 R |
| 5,993,197 | A | 11/1999 | Klber et al. | |
| 6,027,334 | A | 2/2000 | Blaschke | |
| 7,762,807 | B2 | 7/2010 | Linck et al. | |
| 8,573,968 | B2 | 11/2013 | Kaupert | |
| 2002/0015930 | A1 | 2/2002 | Poe et al. | |
| 2003/0027090 | A1* | 2/2003 | Blaschke ................ | B01B 1/005 431/243 |
| 2004/0170936 | A1 | 9/2004 | Weclas et al. | |
| 2006/0147854 | A1 | 7/2006 | Fullemann | |
| 2007/0231761 | A1 | 10/2007 | Rosen et al. | |
| 2009/0263757 | A1 | 10/2009 | Kaupert | |
| 2010/0092897 | A1 | 4/2010 | Inunning et al. | |
| 2011/0173953 | A1* | 7/2011 | Neels .................... | F01N 3/0253 60/274 |
| 2012/0205066 | A1* | 8/2012 | Humburg ................ | F24H 1/009 165/56 |
| 2013/0157206 | A1* | 6/2013 | Li ........................... | F23M 5/00 431/159 |
| 2013/0337388 | A1 | 12/2013 | Schwanecke et al. | |
| 2014/0186782 | A1* | 7/2014 | Eberspach .............. | F23C 13/06 431/268 |
| 2014/0346242 | A1 | 11/2014 | Jozinovic et al. | |
| 2015/0027428 | A1* | 1/2015 | Ilchenko ................. | F23C 7/004 126/95 |
| 2017/0153026 | A1* | 6/2017 | Dell .......................... | F23D 3/40 |

FOREIGN PATENT DOCUMENTS

| | | | | |
|---|---|---|---|---|
| CN | 201129723 Y | 10/2008 | | |
| CN | 201636854 U | 11/2010 | | |
| CN | 201786438 U | 4/2011 | | |
| CN | 102200279 A | 9/2011 | | |
| CN | 202813362 U | 3/2013 | | |
| DE | 19 18 445 A1 | 10/1970 | | |
| DE | 28 12 960 A1 | 10/1978 | | |
| DE | 34 03 972 A1 | 8/1985 | | |
| DE | 3923238 A1 | 1/1991 | | |
| DE | 43 04 057 A1 | 8/1994 | | |
| DE | 195 29 994 A1 | 5/1996 | | |
| DE | 195 48 223 A1 | 6/1997 | | |
| DE | 197 03 555 A1 | 8/1998 | | |
| DE | 198 21 673 A1 | 11/1999 | | |
| DE | 101 20 027 A1 | 4/2002 | | |
| DE | 101 51 617 A1 | 5/2003 | | |
| DE | 102 00 524 C1 | 8/2003 | | |
| DE | 102 19 633 C1 | 12/2003 | | |
| DE | 102004022302 A1 | 12/2005 | | |
| DE | 44 47 987 B4 | 3/2006 | | |
| DE | 10 2006 031867 A1 | 1/2008 | | |
| DE | 10 2004 049902 A1 | 4/2008 | | |
| DE | 10 2011 087971 A1 | 6/2012 | | |
| DE | 102011104051 A1 * | 12/2012 | ............ | F23D 11/443 |
| EP | 1 519 110 A1 | 3/2005 | | |
| EP | 1 860 379 A2 | 11/2007 | | |
| FR | 2817946 A1 * | 6/2002 | ............ | F23C 13/00 |
| JP | S5364831 A | 6/1978 | | |
| JP | S57174607 A | 10/1982 | | |
| JP | 361188217 A | 8/1986 | | |
| JP | H0524430 A | 2/1993 | | |
| JP | H0749104 A | 2/1995 | | |
| JP | H10246408 A | 9/1998 | | |
| JP | 2000018520 A | 1/2000 | | |
| JP | 2003240211 A * | 8/2003 | ............ | F23D 3/40 |
| JP | 2004156898 A | 6/2004 | | |
| JP | 2004163090 A | 6/2004 | | |
| JP | 2010038519 A * | 2/2010 | ............ | F23C 7/004 |
| KR | 101278280 B1 | 6/2013 | | |
| RU | 2213298 C1 | 9/2003 | | |
| RU | 48619 U1 | 10/2005 | | |
| WO | 2012149928 A1 | 11/2012 | | |
| WO | 2012155897 A1 | 11/2012 | | |
| WO | 2013104349 A1 | 7/2013 | | |
| WO | 2013127393 A1 | 9/2013 | | |
| WO | 2015 014336 A1 | 2/2015 | | |

OTHER PUBLICATIONS

"EP_1860379—Machine Translation.pdf", machine translation, EPO. org, Jun. 11, 2018.*

International Search Report and Written Opinion dated Jun. 15, 2015 for International Application No. PCT/DE2015/100100.

European Patent Office, Machine-Generated English Language Translation of DE 10200524, Jun. 13, 2018, 7 pages.

European Patent Office, Machine-Generated English Language Translation of DE 4447987, Jun. 12, 2018, 23 pages.

(56) References Cited

OTHER PUBLICATIONS

European Patent Office, Machine-Generated English Language Translation of DE 4304057, Jun. 13, 2018, 6 pages.

* cited by examiner

EVAPORATOR BURNER ARRANGEMENT FOR A MOBILE HEATER OPERATED WITH LIQUID FUEL

CROSS-REFERENCE TO RELATED APPLICATIONS

This application represents the national stage entry of PCT International Application No. PCT/DE2015/100100 filed Mar. 11, 2015, which claims priority of German Patent Application 10 2014 103 813.4 filed Mar. 20, 2014, the contents of which are hereby incorporated herein by reference for all purposes.

The present invention relates to an evaporator burner arrangement for a mobile heater operated with liquid fuel and to a mobile heater operated with liquid fuel having such an evaporator burner arrangement.

In mobile heaters which are operated with liquid fuel often evaporator burner are employed in which the liquid fuel is evaporated, the evaporated fuel is mixed with supplied combustion air to a fuel-air-mixture and is subsequently converted thereby releasing heat.

In the present context, "mobile heater" is to be understood as a heater which is configured for use in mobile applications and is adapted accordingly. This means in particular that it is transportable (fixedly mounted in a vehicle or only placed therein for transport, as the case may be) and is not only configured for permanent, stationary use, as would be the case in heating of a building. The mobile heater can also be fixedly installed in a vehicle (land vehicle, ship, etc.), in particular in a land vehicle. In particular, it can be configured for heating a vehicle interior, such as e.g. of a land vehicle, a boat or an airplane, or a partly open space, as can be found on boats, in particular yachts. The mobile heater can also temporarily be used in a stationary manner, such as e.g. in big tents, containers (e.g. containers for construction sites), etc. In particular, the mobile heater can be configured as a parking heater or supplementary heater for a land vehicle, such as e.g. for a caravan, a camper van, a bus, a passenger car, etc.

In view of environmental aspects and the corresponding legislation in many countries, it becomes increasingly important to minimize the exhaust gas emissions of mobile heaters. In particular in the case of evaporator burners for mobile heaters there exists the difficulty that operation under different environmental conditions and in different heating power levels shall take place as efficiently as possible and with low exhaust gas emissions.

It is an object of the present invention to provide an improved evaporator burner arrangement and an improved mobile heater operated with liquid fuel having an evaporator burner arrangement which enable stable conversion of a fuel-air-mixture with reduced emissions.

The object is solved by an evaporator burner arrangement for a mobile heater operated with liquid fuel according to claim 1. Advantageous further developments are specified in the dependent claims.

The evaporator burner arrangement comprises: a mixture preparation region for generating a fuel-air-mixture, a fuel evaporation surface arranged in the mixture preparation region for evaporating the liquid fuel, a combustion air supply for supplying combustion air to the mixture preparation region, a fuel supply for supplying liquid fuel to the fuel evaporation surface, a conversion region being arranged fluidically downstream of the mixture preparation region for converting the fuel-air-mixture in order to release heat, and a heat conductor body extending spaced from a sidewall of the mixture preparation region through the mixture preparation region to the conversion region for feeding-back heat from the conversion region to the mixture preparation region by thermal conductance.

A mixture preparation region is to be understood as a region of the evaporator burner arrangement in which—during normal heating operation of the evaporator burner arrangement—mixing of evaporated fuel with combustion air takes place, but no conversion of the fuel-air-mixture under release of heat takes place, in particular no flame is formed. In the mixture preparation region, advantageous conditioning of the fuel-air-mixture can take place before its conversion in the conversion region. A conversion region is to be understood as the region of the evaporator burner arrangement in which in operation of the evaporator burner arrangement conversion of the fuel-air-mixture, thereby releasing heat, takes place, which can in particular take place in a flaming combustion. However, e.g. also conversion in a flame-less catalytic process is also possible.

By the spatial and functional separation of the mixture preparation region and the conversion region, it is achieved that a well-mixed fuel-air-mixture is provided for the conversion process in the conversion region, which enables a conversion low in emissions. The mixture preparation region and the conversion region can in particular be arranged one after another in an axial direction with respect to a longitudinal axis of the evaporator burner arrangement. Via the heat conductor body, heat from the conversion process in the conversion region can systematically be fed-back for supporting the evaporation process in the mixture preparation region, whereby reliable formation of a homogeneous fuel-air-mixture is enabled in the mixture preparation region. Since feeding-back of heat takes places mainly via the heat conductor body, the amount of fed-back heat can in a convenient way be predetermined by the dimensioning of the heat conductor body. Preferably, the heat conductor body can be formed as an axial body which extends substantially parallel to a longitudinal axis of the combustion chamber arrangement. Preferably, the heat conductor body can extend into the conversion region.

According to a further development the heat conductor body extends rod-shaped along a longitudinal axis of the mixture preparation region. In this case, the heat conductor body can be formed additionally such that it positively influences the conduction of the flow for the fuel-air-mixture.

According to a further development the mixture preparation region has a tapering portion tapering in the direction towards the conversion region. In this case, the flow velocity can be increased reliably in the mixture preparation region to such an extent that a light-back of the flame from the conversion region into the mixture preparation region is prevented. The tapering portion can in particular be formed as conically tapering in order to enable particularly easy production and to achieve a particularly advantageous conduction of the flow. Another shape is, however, also possible.

According to a further development an abrupt widening of the cross-section is formed at a transition from the mixture preparation region to the conversion region. In this case, particularly advantageous flame anchoring is enabled in the conversion region wherein a recirculation region forms in a region at the longitudinal axis of the conversion region, in which recirculation region the gases flow oppositely to a main flow direction in the direction towards the mixture preparation region. This advantageous effect can in particular be achieved if the combustion air is supplied to the mixture preparation region with a strong swirl and the mixture preparation region comprises a tapering portion in which the cross-section available for the flowing fuel-air-mixture tapers in the direction towards the conversion region. Further, a reliable structural and functional separation of the mixture preparation region and the conversion region is provided in this case.

According to a further development the combustion air supply comprises a swirl body with which a swirl flow is impressed onto the supplied combustion air. In this case, anchoring of the flame in the conversion region can particularly reliably be achieved. Further, it is achieved in this case that the supplied combustion air is reliably guided over the fuel evaporation surface such that evaporation of the liquid fuel is additionally supported and preparation of the fuel-air-mixture is improved. Further, in this case the fuel distribution at the fuel evaporation surface becomes improved.

According to a further embodiment a sidewall of the mixture preparation region is thermally insulated with regard to the conversion region. In this case it is ensured that the sidewall of the mixture preparation region is maintained at a relatively low temperature level such that a trend towards formation of deposits is suppressed. Further, it is achieved in this case that heat back-feeding from the conversion region for supporting the evaporation process in the mixture preparation region takes place well-defined substantially via the heat conductor body such that the extent of heat back-feeding can be adjusted very systematically by the dimensioning of the heat conductor body.

According to a further development the fuel evaporation surface is formed by an exposed sidewall of the mixture preparation region. In this context, exposed means that the sidewall is not covered by an additional evaporator body from a porous, absorbent material but instead the surface of the sidewall itself provides the fuel evaporation surface. In this case, formation of deposits can in particular reliably be suppressed if the sidewall of the mixture preparation region is thermally insulated from the conversion region and heat back-feeding from the conversion region into the mixture preparation region mainly takes place via the heat conductor body. In doing so, fuel evaporation can systematically be supported by heat radiation from the heat conductor body to the fuel evaporation surface and simultaneously the temperature level of the sidewall providing the fuel evaporation surface can be maintained relatively low such that particularly residue-free evaporation takes place.

According to a further development the fuel evaporation surface is formed by the exposed sidewall in the region of the tapering portion. In this case it can be reliably ensured that a fuel film spreads substantially over the whole fuel evaporation surface and that the supplied combustion air flows along the fuel evaporation surface. In particular in combination with the described supply of the combustion air with a strong swirl, thus a particularly stable combustion process which is low in emissions can be realized.

According to another further development the fuel evaporation surface is formed by an evaporator body from an absorbent, porous material. The evaporator body can in particular comprise a metal non-woven fabric, a metal woven fabric and/or a metallic or ceramic sintered body. The evaporator body from an absorbent, porous material provides a large fuel evaporation surface available for evaporation and additionally exerts to a certain extent a storage function and a distribution function.

According to a further development the evaporator body is arranged at an outer circumferential surface of the heat conductor body. Preferably, in this case the heat conductor body can be formed as an axial body which extends along a longitudinal axis of the evaporator burner. By arranging the evaporator body at an outer circumferential surface of the heat conductor body, reliable circulation of combustion air around the fuel evaporation surface is ensured and heat for supporting the evaporation process can be fed back very systematically via the heat conductor body to the evaporator body.

According to a further development a cover is provided at an end of the evaporator body facing the conversion region. In this case, uncontrolled spill of fuel at the face-side end of the evaporator body can be reliably prevented and the flow at the entry into the conversion region can be adjusted systematically.

According to a further development a support air supply is provided for supplying a portion of the combustion air in a transition portion via which the mixture preparation region transitions into the conversion region. In this case, additional increase of the flow velocity at the entry into the conversion region and particularly stable mixture preparation are achieved.

According a further development a transition portion via which the mixture preparation region transitions into the conversion region is provided with a variation in cross-section for improving the flow-off profile. In this case, particularly stable flow conditions can be maintained even under unfavorable external conditions.

The object is also solved by a mobile heater operated with liquid fuel having such an evaporator burner arrangement according to claim 15.

Preferably, the heater is formed as a vehicle heater for a parking heater or supplementary heater.

Further advantages and further developments will become apparent from the following description of an embodiment with reference to the enclosed drawings.

FIGS. 4 a) to d) are schematic illustrations of different realizations of a support air supply for improving operation of the evaporator burner arrangement.

FIGS. 5 a) to e) are schematic illustrations of different further developments of a transition portion.

FIGS. 6 a) to i) are schematic illustrations of further developments of the modification shown in FIG. 3.

FIRST EMBODIMENT

A first embodiment of an evaporator burner arrangement will be described in the following with reference to FIG. 1.

The evaporator burner arrangement 100 according to the first embodiment is adapted for a mobile heater operated with liquid fuel. The evaporator burner arrangement 100 is particularly adapted for a vehicle heater, in particular for a parking heater or supplementary heater of a motor vehicle.

The evaporator burner arrangement 100 extends along a longitudinal axis Z. The evaporator burner arrangement 100 comprises a mixture preparation region 2 which comprises a main chamber 21, a tapering portion 22 following up the main chamber 21, and a transition portion 23 following up the tapering portion 22. In the tapering portion 22, the cross-section of the mixture preparation region 2 tapers in a main flow direction H which extends substantially parallel to the longitudinal axis Z. A conical realization of the tapering portion 22 is exemplarily shown in the schematically illustrated embodiment, but other shapes are also possible. The transition portion 23 forms a transition to the conversion region 3 following up the mixture preparation region 2, which conversion region 3 is formed as a combustion chamber in the embodiment. The conversion region 3 is arranged fluidically downstream of the mixture preparation region 2, as will become apparent more in detail from the following description. In the embodiment the transition portion 23 comprises a substantially cylindrical shape having an at least predominantly constant cross-section. However, a different shape is also possible.

At a transition from the transition portion 23 of the mixture preparation region 2 to the conversion region 3, an abrupt widening of the cross-section is formed. Thus, the flow cross-section available for the gases flowing in the evaporator burner arrangement 100 abruptly widens at the transition from the mixture preparation region 2 to the conversion region 3, as can be seen in FIG. 1.

In operation of the evaporator burner arrangement 100, conversion of a fuel-air-mixture in a flaming combustion thereby releasing heat takes place in the conversion region 3. The combustion exhaust gases A arising from this conversion flow through a burner pipe 4, which is subsequent to the conversion region 3, into a heat exchanger 5 in which at least a portion of the released heat is transferred to a medium M to be heated. In the schematically illustrated embodiment, the heat exchanger 5 is formed cup-shaped and the hot combustion exhaust gases A are deflected at the end of the burner pipe 4 at the bottom of the heat exchanger 5. After deflection, the combustion exhaust gases A flow off to an exhaust gas outlet 6 in a flow space formed between the outer side of the burner pipe 4 and an inner jacket of the heat exchanger 5.

Figure 1:
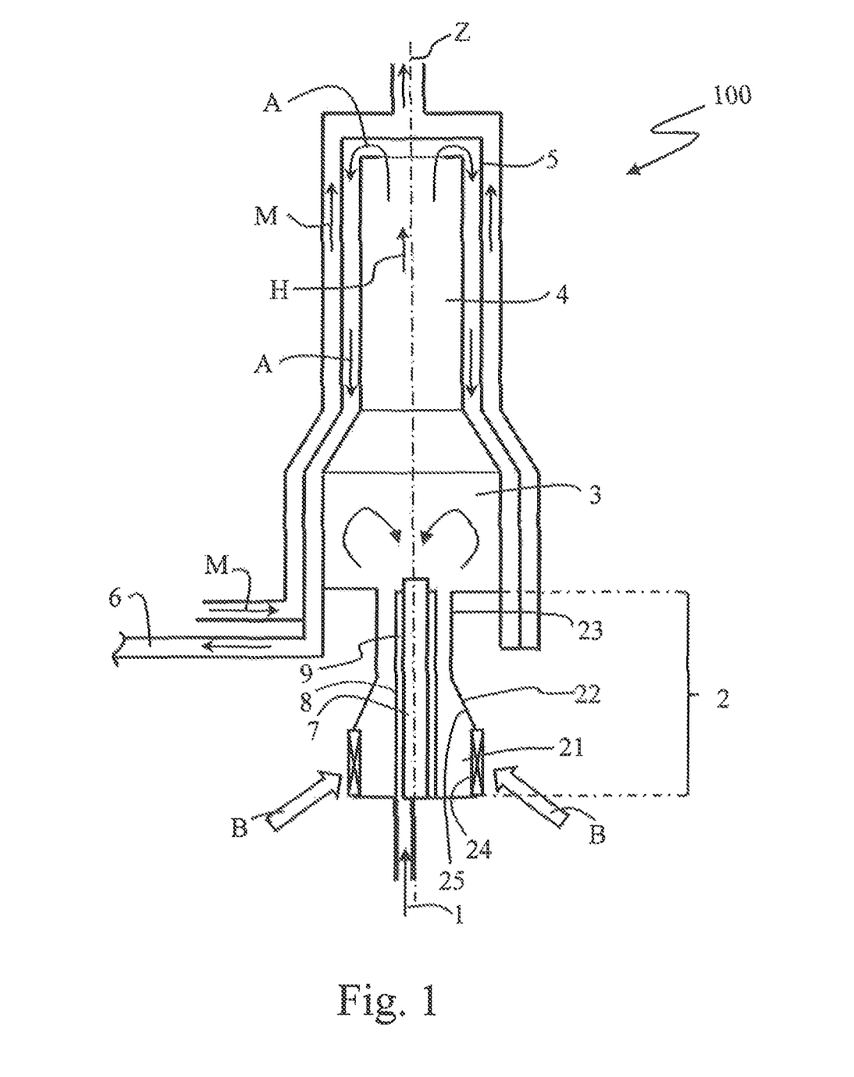
FIG. 1 is a schematic illustration of an evaporator burner arrangement according to a first embodiment.

The medium to be heated M flows in a flow space formed between the inner jacket of the heat exchanger 5 and an outer jacket of the heat exchanger 5, as schematically depicted by arrows in FIG. 1. In the embodiment, the medium to be heated M flows in the opposite direction with regard to the flow direction of the combustion exhaust gases A in the heat exchanger 5 in order to achieve an as good as possible heat exchange. The medium to be heated M can in particular be formed by e.g. air to be heated or by a liquid to be heated, in particular a cooling liquid in a coolant circuit of a vehicle. The inner jacket of the heat exchanger 5 is made from a material having high thermal conductivity in order to secure good heat exchange from the hot combustion exhaust gases A to the medium to be heated M.

In the following, the realization of the mixture preparation region 2 in the first embodiment will be described more in detail.

The evaporator burner 100 comprises a fuel supply 1 for supplying a liquid fuel. The liquid fuel can in particular be formed by a motor fuel which is also used for operation of a combustion engine of the vehicle, such as benzine, diesel, ethanol, or the like. The fuel supply 1 is only schematically depicted in FIG. 1 by a fuel supply line and an arrow. The fuel supply 1 can however—a per se known manner—also comprise a fuel conveying device which can in particular e.g. be formed by a fuel dosing pump. The fuel supply 1 is adapted to convey and dose fuel in a well-defined manner.

The fuel supply 1 opens out in the mixture preparation region 2. In the schematically depicted embodiment, the fuel supply 1 opens out at a rear wall of the mixture preparation region 2, which closes the mixture preparation region 2 at the backside. Laterally the mixture preparation region 2 is confined by a sidewall 25 which defines the course of the main chamber 21, the tapering portion 22, and the transition portion 23.

Further, a combustion air supply B is provided which is schematically illustrated by arrows in FIG. 1. The combustion air supply B comprises a combustion air blower (not shown) for conveying combustion air to the mixture preparation region 2. In the region of the main chamber 21, the mixture preparation region 2 comprises a plurality of combustion air inlets via which the combustion air can enter into the mixture preparation region 2. In the embodiment, the combustion air is introduced into the mixture preparation region 2 with a large swirl, i.e. with a large tangential flow component. The swirl can be impressed onto the combustion air e.g. by correspondingly orientated guide vanes or the like. In FIG. 1, a swirl body 24 provided with guide vanes via which a large swirl is impressed onto the supplied combustion air is schematically illustrated. Although a swirl body 24 with which the combustion air is supplied laterally to the mixture preparation region 2 is schematically depicted in FIG. 1, other arrangements are also possible. For instance, the combustion air can also be supplied to the mixture preparation region 2 in a radially outer region of the rear wall to the mixture preparation region 2.

In the first embodiment, a heat conductor body 7 is arranged in the mixture preparation region 2, which heat conductor body 7 extends starting from the rear wall of the mixture preparation region 2 spaced from the sidewall 25 of the mixture preparation region 2 along the longitudinal axis Z. In the first embodiment the heat conductor body 7 is formed rod-shaped and from a non-porous material. The heat conductor body 7 is formed as an axial body with a substantially cylindrical shape and extends through the main chamber 21, the tapering portion 22, and the transition portion 23. In the realization schematically illustrated in FIG. 1, the heat conductor body 7 protrudes also into the conversion region 3 for a small distance. The heat conductor body 7 is arranged substantially centrally with regard to its radial arrangement in the mixture preparation region 2. The heat conductor body 7 comprises an outer circumferential surface on which an evaporator body 9 from a porous, absorbent material is arranged in the first embodiment. The evaporator body 9 can in particular comprise a metal non-woven fabric (metal fleece), a metal woven fabric, a metallic or ceramic sinter body or the like. Preferably, the evaporator body 9 can entirely surround the entire outer circumference of the heat conductor body 7. In the first embodiment the evaporator body 9 provides a fuel evaporation surface 8 starting from which and out of the volume of which the supplied liquid fuel is evaporated.

Although a realization is schematically depicted in FIG. 1 in which the evaporator body 9 extends almost over the full axial length of the heat conductor body 7, it is e.g. also possible that the evaporator body 9 extends only over a partial region of the heat conductor body 7. Due to the described realization, the evaporator body 9 thus extends tower-shaped into the mixture preparation region 2. The evaporator body 9 extends starting from the rear wall of the mixture preparation region 2 spaced from the sidewall 25 of the mixture preparation region 2 along the longitudinal axis Z. In the embodiment the evaporator body 9 has a substantially hollow-cylindrical shape and rests firmly against the heat conductor body 7.

At the rear wall of the mixture preparation region 2, the supplied liquid fuel is transferred from the fuel supply 1 to the evaporator body 9 in which distribution of the liquid fuel takes place. The fuel supply 1 opens out directly opposite to the evaporator body 9. Due to the porous, absorbent realization of the evaporator body 9, the liquid fuel is distributed both in the circumferential direction of the evaporator body 9 and in the axial direction of the evaporator body 9. Starting from the fuel evaporation surface 8 of the evaporator body 9 the supplied liquid fuel evaporates and is mixed in the mixture preparation region 2 with the supplied combustion air which flows along the fuel evaporation surface 8. Due to supply of the combustion air with a strong swirl, good mixing of the evaporated fuel with combustion air to a fuel-air-mixture takes place already. In doing so, the combustion air flows around the fuel evaporation surface 8 with a tangential flow component. The length of the evaporator body 9 in the axial direction is substantially larger than the width of the evaporator body 9 in the radial direction perpendicular to the axial direction. Here, the width means the maximum extension in the radial direction. In particular, the relation of the length to the width is >1.5, preferably >2.

In the tapering portion 22 of the mixture preparation region 2, the axial flow velocity component of the fuel-air-mixture increases due to the decrease in cross-section. At the transition from the mixture preparation region 2 to the conversion region 3, a widening of the swirl flow of the fuel-air-mixture takes place due to the abrupt widening of the cross-section, whereby the axial flow velocity component decreases and an axial back-flow region or recirculation region forms in the centre of the conversion region 3 close to the longitudinal axis Z, in which recirculation region the gases flow oppositely to the main flow direction H such that in operation of the evaporator burner arrangement 100 anchoring of the flame in the conversion region 3 takes place. In the embodiment the mixture preparation region 2 and the conversion region 3 are thus formed both spatially and functionally separate.

The dimensions of the tapering portion 22, the transition portion 23 and the transition to the conversion region 3 are adjusted such to the swirl flow of the fuel-air-mixture that a light-back of the flame from the conversion region 3 into the mixture preparation region 2 is reliably prevented during normal heating operation. In particular, the combustion air is supplied to the mixture preparation region 2 with a sufficiently large swirl in order to fulfill this condition. Here, it is ensured that the flow velocity in the transition portion 23 is so high that no stable flame can form there. This is in particular additionally supported by the axial arrangement of the heat conductor body 7, since a ring-shaped outlet slit for the fuel-air-mixture is formed by its central arrangement.

The heat conductor body 7 comprises high thermal conductivity and is formed such that in operation of the evaporator burner arrangement 100 heat from the combustion process taking place in the conversion region 3 is fed back by thermal conductance via the heat conductor body 7 to the mixture preparation region 2 in order to achieve an advantageous evaporation process of the liquid fuel at the evaporation surface 8.

Modification

Figure 3:
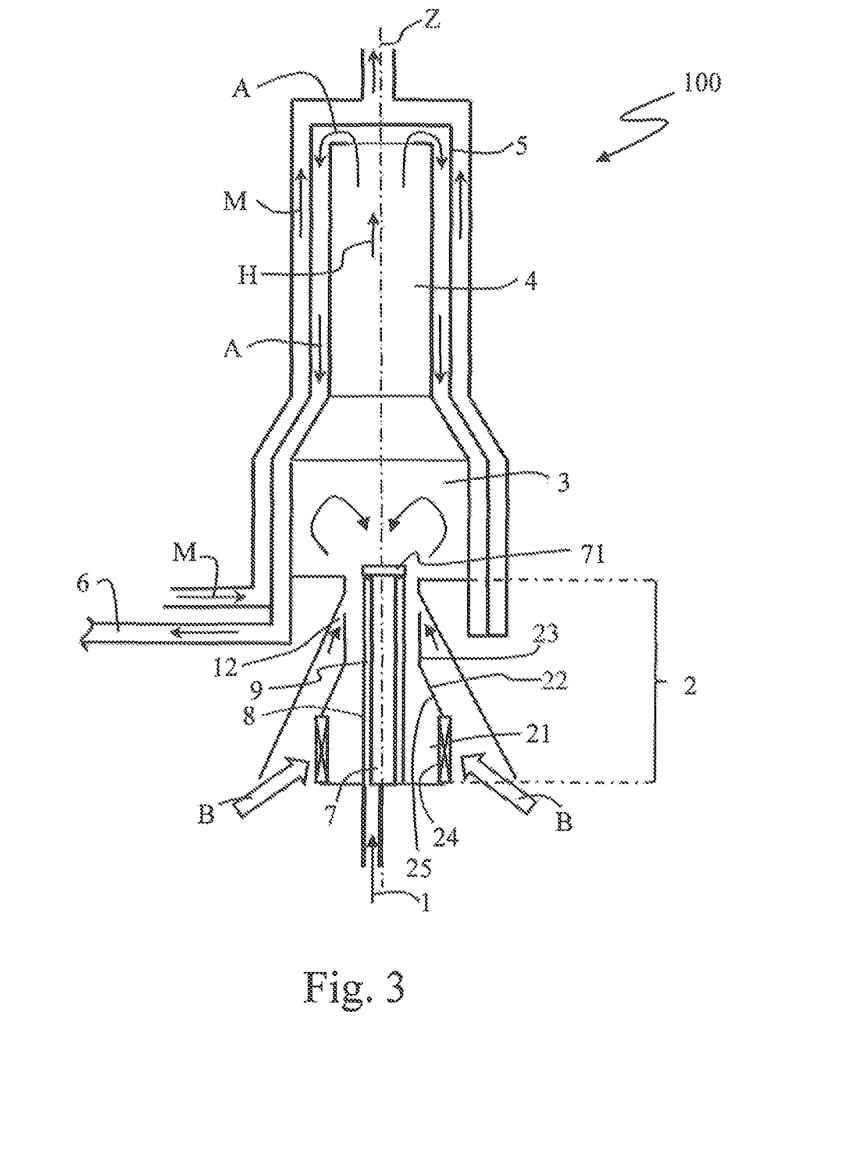
FIG. 3 is a schematic illustration of a modification of the evaporator burner arrangement according to the first embodiment.

A modification of the evaporator burner arrangement of FIG. 1 is schematically depicted in FIG. 3. The modification differs from the above described first embodiment only in that the heat conductor body 7 is provided with an additional cover 71 at its free end facing the conversion region 3 and in that an additional support air supply 12 is provided in the region of the transition portion 23. Since the other components do not differ from the above described first embodiment, the same reference signs as in the first embodiment are used for the modification and the complete construction of the evaporator burner arrangement 100 is not again described, in order to avoid repeating.

Although both the additional cover 71 and the additional support air supply 12 are realized in the modification which will be described in the following, according to a further modification it is e.g. also possible to provide only the cover 71 or only the support air supply 12 additionally.

The cover 71 is arranged at the free end of the heat conductor body 7 such that liquid fuel and also excessive fuel vapor cannot exit at the face side of the heat conductor body 7 in the axial direction, but is instead forced to exit from the evaporator body 9 in the radial direction. As schematically illustrated in FIG. 3, at the free face side of the heat conductor body 7 a cover 71 is provided which protrudes from the outer circumference of the rest of the heat conductor body 7 in the radial direction and covers the free face side of the evaporator body 9. The cover 71 is formed from an at least substantially dense material such that liquid fuel and fuel vapor cannot pass through the cover 71. Preferably, the cover 71 can be made from metal, in particular from temperature resistant stainless steel. The cover 71 can e.g. be formed as a separated cover disk which is unreleasably or releasably fixed to the face side end of the heat conductor body 7. In another realization it is e.g. also possible to produce the cover 71 in one piece with the heat conductor body 7 from the same material.

By the cover 71, it is prevented that fuel or fuel vapor exits from the evaporator body 9 in particular in an increased amount at the free end of the heat conductor body 7. In this way it is achieved that the fuel is at least substantially completely supplied in the mixture preparation region 2 for formation of the fuel-air-mixture. Thus, mixture preparation in the mixture preparation region 2 is further improved. Further, adverse affects on flame anchoring in the conversion region 3 are prevented.

Figure 6:
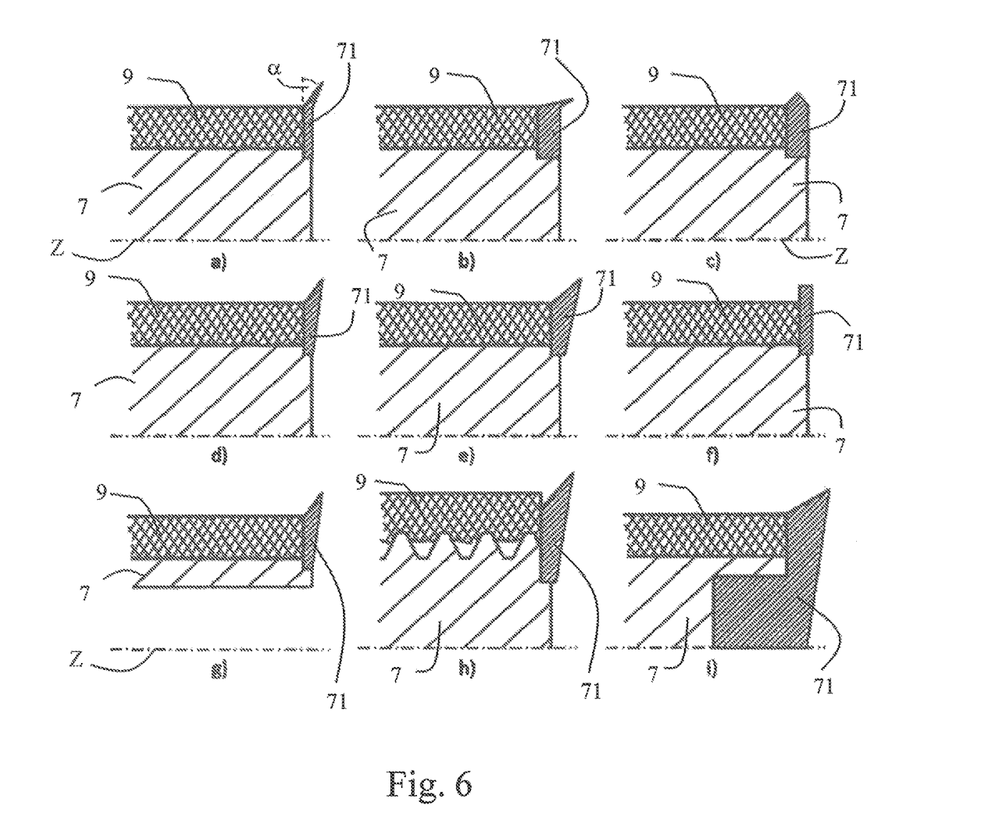

In FIGS. 6 a) to i) different further modifications of the cover 71 are schematically illustrated. Also these further modifications of the cover 71 can each be provided in the case of a substantially solid heat conductor body 7, as has been described with reference to FIG. 1, as well as in the case of a heat conductor body 7 having an internal cavity, as illustrated in FIG. 6 g).

According to the further modifications of the cover 71 illustrated in FIGS. 6 a) to i), the cover 71 protrudes in each case in the radial direction from the outer circumference of the evaporator body 9 and provides an at least substantially sharp flow break-away edge for the flow streaming along the outer circumference of the heat conductor body 7 and of the evaporator body 9. As schematically illustrated in FIG. 6 a), the region of the cover 71 protruding in the radial direction extends under an angle $\alpha$ with respect to a plane running perpendicular to the longitudinal axis Z. The angle $\alpha$ can—depending on the desired conductance of the flow—comprise a value between 0° and 90°.

In the modification which is schematically illustrated in FIG. 6 a), the region of the cover 71 protruding in the radial direction extends e.g. under an angle $\alpha$ in the range between 35° and 45° such that the gases streaming at the outer circumference of the evaporator body 9 are relatively strongly deflected to the outside radially. Further, in this modification the protruding region is formed as a lip tapering in the radial direction which protrudes both in the radial and the axial direction. The protruding region is formed as slightly angled in the direction of the main flow direction H in relation to the rest of the cover 71.

In the modification which is schematically illustrated in FIG. 6 b), the region of the cover 71 protruding in the radial direction extends under a substantially larger angle α being in the range between 160° and 170° such that substantially lower radial deflection of the gases streaming at the outer circumference of the evaporator body 9 takes place.

In the modification which is schematically illustrated in FIG. 6 *c*), the region of the cover protruding in the radial direction e.g. extends under an angle between approx. 40° and 50°. Further, in this modification the protruding region of the cover 71 is beveled or sloped, respectively, at the side facing away from the evaporator body 9 in order to systematically influence the flow disruption.

In the modifications which are schematically illustrated in FIGS. 6 *d*) and *e*), in each case the cover 71 comprises an overall rather wedge-shaped cross-section such that the protruding region of the cover 71—different from the modifications according to FIG. 6 *a*) and FIG. 6 *b*)—is not formed angled with respect to the rest of the cover 71. As can be seen by comparison of the modifications according to FIGS. 6 *a*) and *b*) and the modifications according to FIGS. 6 *d*), 6 *e*) and 6 *i*), the wedge angle of the radially protruding region of the cover 71 can systematically be adjusted in this manner.

In the modification which is schematically illustrated in FIG. 6 *f*), the cover 71 is formed as a substantially annular disk at the end of the heat conductor body 7 such that the protruding region of the cover protrudes laterally under an angle α of approximately 0°.

In the modification which is schematically illustrated in FIG. 6 *g*), the heat conductor body 7 is provided with an internal cavity which is formed open in the direction towards the conversion region 3. In this case, e.g. gases from the conversion region 3 can flow into the interior of the heat conductor body 7. These additional features can e.g. also be provided in the other modifications.

In FIG. 6 *h*), a surface structuring of the outer circumference of the heat conductor body 7 is exemplarily illustrated. Such a surface structuring can preferably also be provided in the other illustrations according to FIGS. 6 *a*) to *g*) and *i*). In the modification of FIG. 6 *h*), the cover 71 further directly abuts the face side of the evaporator body 9 in a radially inner region and extends under an angle α of approximately 0°. A region of the cover 71 situated further outside extends however under a larger angle α such that again a radially protruding tapering lip is formed. Further, in this case the cover 71 does not directly abut the evaporator body 9 in a radially outer region of the evaporator body 9. Also these additional features of the modification according to FIG. 6 *h*) can further also be realized in the other modifications.

In the modification schematically illustrated in FIG. 6 *i*) the cover 71 is formed as an inset which is set in a face-side recess of the heat conductor body 7 with a central protruding stud. Also these further features can in each case be realized in the other modifications.

The realization of the cover 71 with the described tear-off edge has the further advantage that the flow is stabilized even better at the entry into the conversion region 3. Below others, in this manner formation of pulsations can be suppressed. Further, back-lighting of the flame into the mixture preparation region 2 can be prevented even more reliably. Overall, by the modifications of the cover 71 with the described tear-off edge for the flow of the fuel-air-mixture, in particular also the formation of the recirculation region in the conversion region 3 can additionally become further stabilized.

In contrast to the above described first embodiment, the supplied combustion air is divided in the modification such that a portion of the supplied combustion air is not supplied into the main chamber 21 of the mixture preparation region 2 via the swirl body 24 but further downstream with regard to the main flow direction H. Dividing the supplied combustion air can be realized in a simple way under constructional aspects by shaping the flow paths for the combustion air. As schematically illustrated in FIG. 3, in the modification a support air supply 12 is provided via which a portion of the combustion air is supplied to the mixture preparation region 2 not before the transitional portion 23. The realization is chosen such that the predominant portion of the combustion air is supplied into the main chamber 21 via the swirl body 24 and only a small portion of the combustion air, which can in particular preferably be less than ten percent of the total amount of combustion air, is supplied via the support air supply 12. The support air supply 12 is arranged in the region in which the mixture preparation region 2 transitions into the conversion region 3. The support air supply 12 enables additional stabilization of the flow conditions in the evaporator burner arrangement 100.

The support air supply 12 effects additional acceleration of the fuel-air-mixture flowing into the conversion region 3 and ensures that preparation of the mixture remains stable even in the case of undesired fluctuations and secondary effects. In the illustrated specific realization, the support air supply 12 further has the effect that the main flow of the fuel-air-mixture runs along the heat conductor body 7 in the transition portion 23 and thus prevents too early coming-off of the flow from the heat conductor body 7. In this manner, lighting-back or back-burning of a flame from the conversion region 3 into the mixture preparation region 2 is prevented even more reliably in the modification.

Since the flow conditions are stabilized additionally in this way, further more even temperature distribution in the mixture preparation region 2 is achieved which has positive effects on the load on and the lifetime of the components.

Although a very simple constructional realization of the support air supply 12 is illustrated exemplarily in FIG. 3, different geometric realizations are possible. In particular, the geometric realization can be varied in a simple manner in order to adjust the desired flow conditions and the desired proportion of the combustion air supplied via the support air supply 12.

Figure 4:
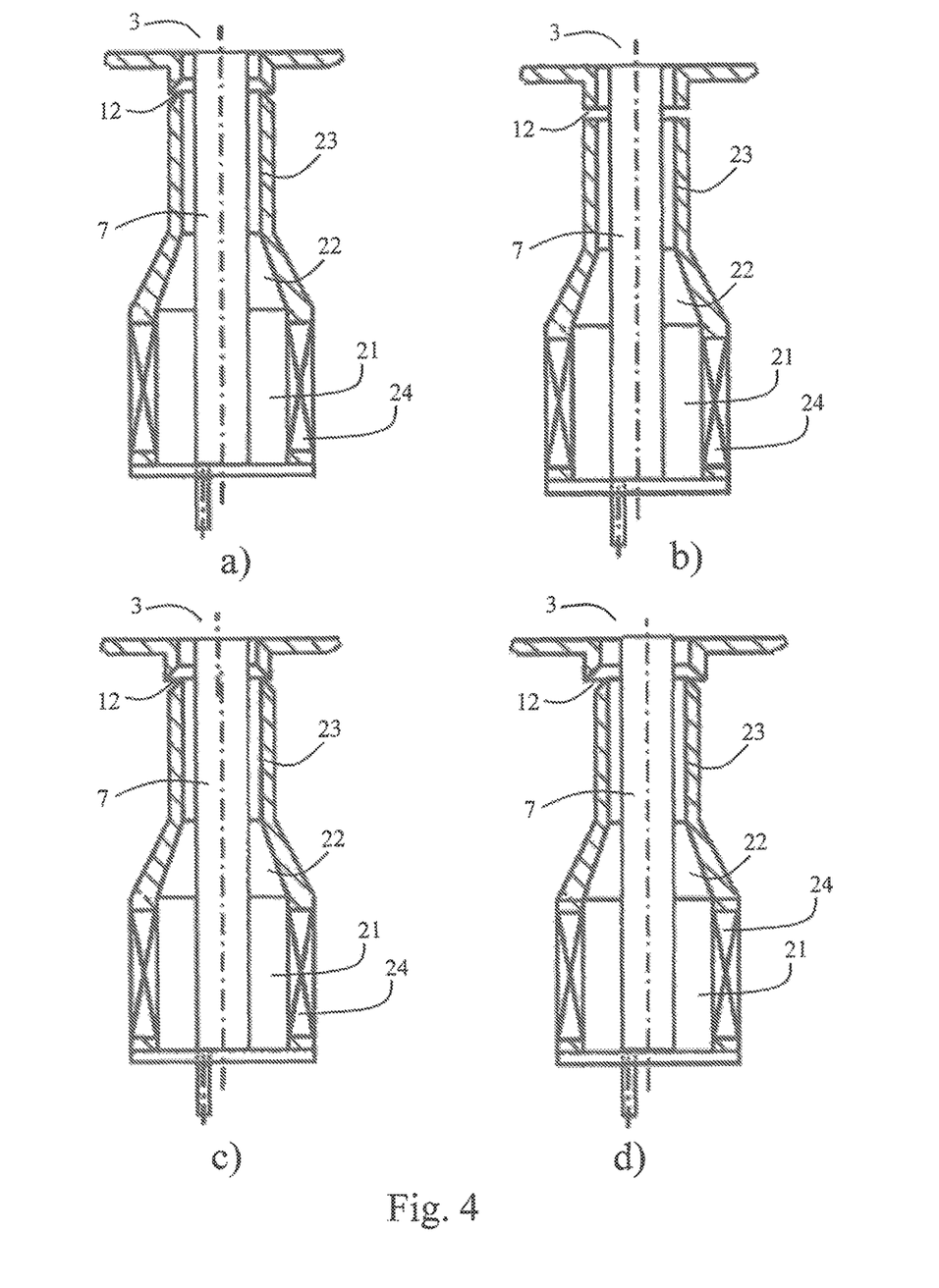

In FIGS. 4 *a*) to *d*), different possible realizations of the support air supply 12 are schematically illustrated. In the schematic illustration of FIGS. 4 *a*) to *d*) no evaporator body 9 is depicted at the outer circumference of the heat conductor body 7. It is however also possible in each case that an evaporator body 9 is arranged at the outer circumference of the heat conductor body 7, as in the above described first embodiment. Further, only a section of the evaporator burner arrangement 100 in the region of the mixture preparation region 2 is shown in FIGS. 4 *a*) to *d*).

The different realizations of the support air supply 12 in FIGS. 4 *a*) to *d*) differ in the specific realization of the outlet openings for the support air. While in FIG. 4 *a*) a realization is shown in which the support air is supplied substantially rotational symmetrically both in the radial direction and in the axial direction, a realization is shown in FIG. 4 *b*) in which the support air is supplied substantially in the radial direction. It is to be noted that the support air can also additionally have a tangential flow component, as the case may be. The outlet openings for the support air can e.g. be formed as a continuous slit or as a plurality of through-holes in the wall of the transition portion 23. As schematically illustrated in FIG. 4 *c*), e.g. the region of the transition region 23 which is adjacent to the conversion region 3 can also be realized as slightly offset with regard to the rest of the transition region 23 in order to realize off-centered supply of the support air. It is further e.g. also possible that the region of the transition portion 23 which is adjacent to the conversion region 3 has a slightly larger diameter in order to systematically influence on the flow conductance, as e.g. schematically illustrated in FIG. 4 d). Further, it is e.g. also possible to form the support air supply as not rotational symmetrically but systematically asymmetric in order to additionally modulate the flow conductance, whereby further stabilization of the conversion in the conversion region 3 and suppression of oscillations are enabled.

SECOND EMBODIMENT

Figure 2:
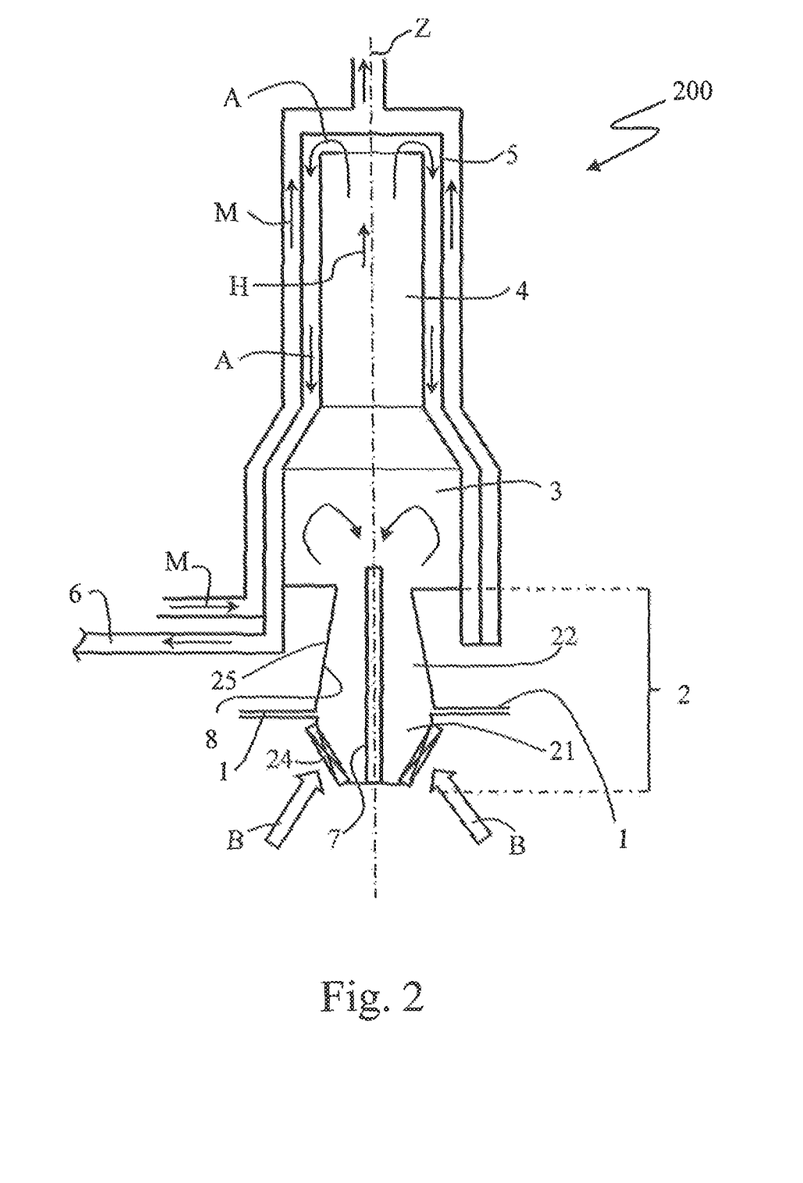
FIG. 2 is a schematic illustration of an evaporator burner arrangement according to a second embodiment.

In the following a second embodiment of an evaporator burner arrangement will be described with reference to FIG. 2.

Also the evaporator burner arrangement 200 according to the second embodiment is formed for a mobile heater operated with liquid fuel. The evaporator burner arrangement 200 is again specifically adapted for a vehicle heater, in particular for a parking heater or supplementary heater of a motor vehicle.

The evaporator burner arrangement 200 according to the second embodiment substantially differs from the above described embodiment only in the realization of the mixture preparation region 2 such that the same reference signs are used for corresponding components and that repeated description of unamended components is omitted in order to avoid unnecessary repeating.

Also in the second embodiment the mixture preparation region 2 has a main chamber 21 and a tapering portion 22 following it in the main flow direction H, which tapering portion 22 increasingly tapers in the direction towards the conversion region 3. In contrast to the above described embodiment, no further transition region is formed between the tapering portion 22 and the conversion region 3. According to a modification it is however possible to provide a transition portion as in the first embodiment. As in the first embodiment, an abrupt widening of the cross-section is formed at the transition from the mixture preparation region 2 to the conversion region 3 such that the flow cross-section available for the flowing gases widens abruptly.

In the second embodiment a combustion air supply B with a swirl body 24 is provided via which combustion air can be supplied to the mixture preparation region 2 with a strong swirl. The combustion air is supplied laterally into the mixture preparation region 2 as in the first embodiment. According to a modification it is however also possible also in the second embodiment to supply the combustion air e.g. in a radial outer region of the rear wall of the mixture preparation region 2.

Also in the second embodiment a heat conductor body 7 is arranged in the mixture preparation region 2 spaced from the sidewall 25 of the mixture preparation region 2 and extends through the tapering portion 22 into the conversion region 3 in order to systematically feed back heat from the conversion process in the conversion region 3 to the mixture preparation region 2 by thermal conductance. All explanations with regard to the heat conductor body 7 including with regard to the possible modifications and realizations which were presented with regard to the first embodiment are also applicable to the heat conductor body 7 in the second embodiment.

Different from the first embodiment, no evaporator body from a porous material is provided at the outer circumferential surface of the heat conductor body 7 in the second embodiment, but the fuel evaporation surface 8 is formed by the sidewall 25 of the mixture preparation region 2 in the tapering portion 22. In the specific embodiment, the fuel supply 1 opens out at the region of the sidewall 25 providing the fuel evaporation surface 8. The outlet of the fuel supply 1 is located at an upstream end of the fuel evaporation surface 8 with regard to the main flow direction H.

As in the first embodiment, also in the evaporator burner arrangement 200 according to the second embodiment the sidewall 25 of the mixture preparation region 2 is thermally insulated from the conversion region 3 such that heat back-feeding by thermal conductance to the mixture preparation region 2 takes place mainly via the heat conductor body 7 which is formed as an axial body also in the second embodiment.

In operation of the evaporator burner arrangement 200, the supplied liquid fuel is distributed at the sidewall 25 providing the fuel evaporation surface 8 by the combustion air supplied with a strong swirl. Since the fuel evaporation surface 8 is formed at the tapering portion 22 it is secured that the formed fuel film reliably rests on the sidewall 25. Heat from the conversion region 3 is fed back into the mixture preparation region 2 by heat conductance via the heat conductor body 7. Thus, the part of the heat conductor body 7 located in the mixture preparation region 2 heats up and heat is transferred by thermal radiation to the fuel film which is formed at the sidewall 25 facing the heat conductor body 7. At the same time, the sidewall 25 being thermally insulated from the conversion region 3 remains at a relatively low temperature level such that evaporation of the fuel takes place in a manner in which an extremely low bias towards formation of deposits is given.

During evaporation a good mixing of the evaporating fuel with the combustion air supplied with a strong swirl to a fuel-air-mixture takes place, which fuel-air-mixture enters into the conversion region 3 as very homogeneously mixed. Due to the realization of the mixture preparation region 2 having the tapering portion 22 and the heat conductor body 7 extending along the longitudinal axis Z, the flow velocities of the fuel-air-mixture in the ring-shaped flow space being formed between the sidewall 25 of the mixture preparation region 2 and the heat conductor body 7 are so high that lighting-back of a flame from the conversion region 3 into the mixture preparation region 2 can reliably be prevented. Further, by the strong widening at the entry into the conversion region 3 in combination with the strong swirl of the fuel-air-mixture, a recirculation region forms in the conversion region 3 at the longitudinal axis, as has been described with reference to the first embodiment.

Although it has been described in the second embodiment that the fuel supply 1 opens out directly at the sidewall 25 of the mixture preparation region 2, it is e.g. also possible to supply the fuel at the rear wall of the mixture preparation region 2 and distribute it at the fuel evaporation surface 8 by the combustion air supplied with the strong swirl.

Although no additional support air supply—as described with reference to the modification of the first embodiment— is shown with reference to the second embodiment, it is e.g. also possible to provide such an additional support air supply in a realization corresponding to the second embodiment.

Further Developments

Figure 5:
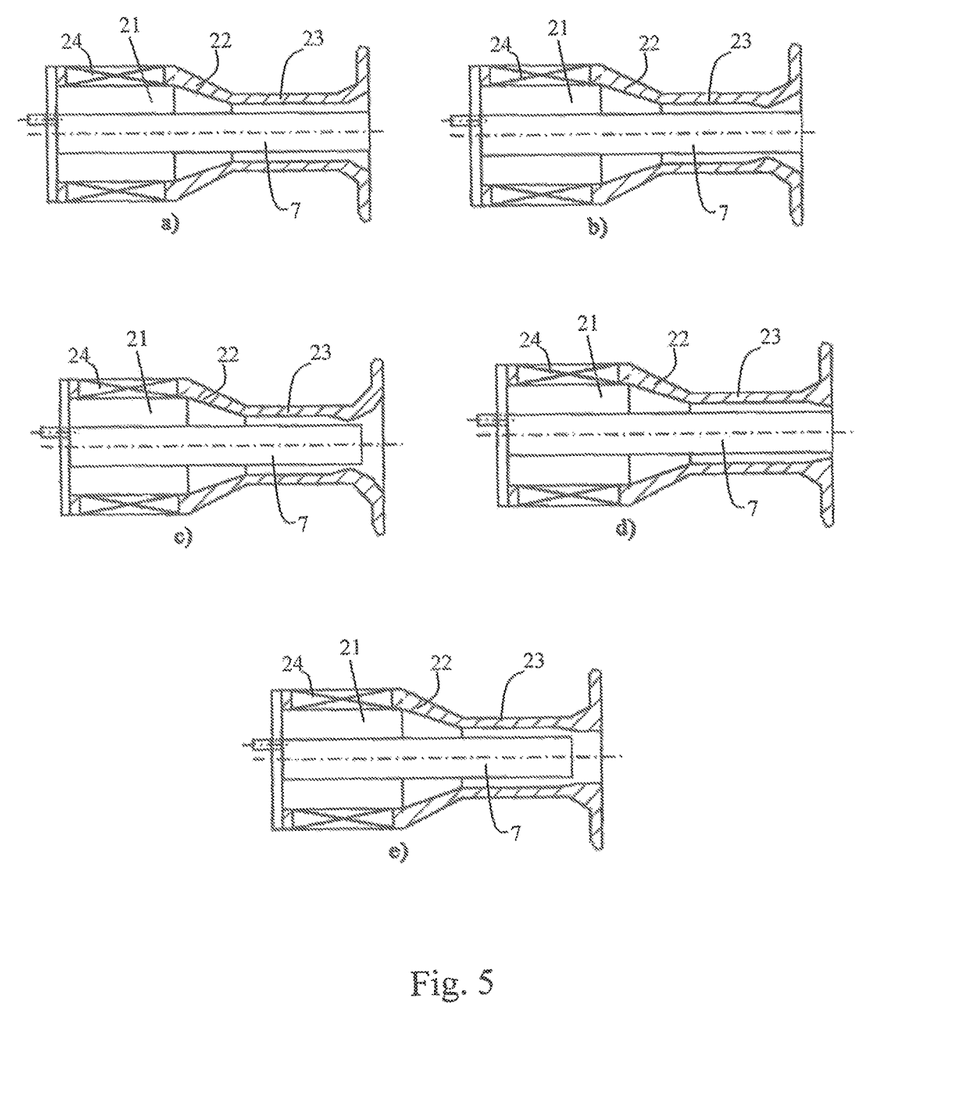

In FIGS. 5 a) to e), different further developments of the transition portion 23 of the mixture preparation region 2 are shown which can be provided both in the first embodiment and its modifications and in the second embodiment.

In the schematic illustrations of FIGS. 5 a) to e), again no evaporator body 9 is shown at the outer circumference of the heat conductor body 7. It is however as in the above described first embodiment in each case possible that an evaporator body 9 is arranged at the outer circumference of the heat conductor body 7. Further, in this case also an additional cover 71 can be provided, as has been described with regard to the modification of the first embodiment. Further, in FIGS. 5 a) to e) again only a section of the evaporator burner arrangement 100 in the region of the mixture preparation region 2 is illustrated and the illustration is rotated by 90 degrees in relation to the preceding illustrations.

The further developments of the transition portion 23 schematically illustrated in FIGS. 5 a) to e) enable further improvement and stabilization of the flow conditions. In particular, by this change of the contour at the transition to the conversion region 3 lighting-back of the flame from the conversion region 3 into the mixture preparation region 2 can be prevented even more reliably.

According to a first realization schematically illustrated in FIG. 5 a), the region of the transition portion 23 which is directly adjacent to the conversion region 3, i.e. the most downstream region of the transition portion 23, can be formed as slightly widening, in particular e.g. as conically widening, in order to achieve an improved flow-off profile. According to a realization schematically illustrated in FIG. 5 b), the inner cross-section of the transition portion 23 first tapers before it widens again in the region directly adjacent to the conversion region 3. In this case, the flow velocity is further increased by the tapering such that back-burning or back-lighting of the flame is prevented even more reliably. In the realization shown in FIG. 5 c), the region of the transition region 23 directly adjoining the conversion region 3 widens in two steps, in particular e.g. in each case conically, with—in the flow direction—first a smaller cone angle and subsequently a larger cone angle.

In the further development illustrated in FIG. 5 d), the inner cross-section of the transition region 23 tapers in the region directly adjacent to the conversion region 3 in order to increase the flow velocity, wherein e.g. conical tapering can be realized. In the realization schematically illustrated in FIG. 5 e), the transition portion 23 comprises directly adjacent to the conversion region 3 and subsequent to a tapering portion a mouth having a constant cross-section.

In the further developments illustrated in FIG. 5 c) and FIG. 5 e), the heat conductor body 7 is illustrated as slightly shortened such that it does not extend over the full length of the mixture preparation region 2, but ends already shortly in front of the end of the mixture preparation region 2 with regard to the main flow direction H. Thus, in these further developments the heat conductor body 7 is formed as slightly retracted into the mouth of the mixture preparation region 2.

The different described geometric realizations can even be combined with each other in order to adjust the desired flow conditions depending on the dimensioning of the other regions.

The invention claimed is:

1. An evaporator burner arrangement for a mobile heater operated with liquid fuel, said burner arrangement comprising:
    a mixture preparation region generating a fuel-air-mixture;
    a fuel evaporation surface arranged in the mixture preparation region for evaporating the liquid fuel;
    a combustion air supply supplying combustion air to the mixture preparation region;
    a fuel supply supplying liquid fuel to the fuel evaporation surface;
    a conversion region arranged fluidically downstream of the mixture preparation region for converting the fuel-air-mixture in order to release heat; and
    a heat conductor body spaced from a sidewall of the mixture preparation region and extending through the mixture preparation region to the conversion region for feeding-back heat from the conversion region to the mixture preparation region by thermal conductance,
    wherein the mixture preparation region includes a tapering portion tapering in a direction towards the conversion region and
    wherein a widening of the cross-section is formed at a transition from the mixture preparation region to the conversion region.

2. The evaporator burner arrangement according to claim 1, wherein the heat conductor body extends rod-shaped along a longitudinal axis (Z) of the mixture preparation region.

3. The evaporator burner arrangement according to claim 1, wherein the combustion air supply includes a swirl body with which a swirl flow is impressed onto the supplied combustion air.

4. The evaporator burner arrangement according to claim 1, wherein a sidewall of the mixture preparation region is thermally insulated with regard to the conversion region.

5. The evaporator burner arrangement according to claim 1, wherein the fuel evaporation surface is formed by an exposed sidewall of the mixture preparation region.

6. The evaporator burner arrangement according to claim 5, wherein the fuel evaporation surface is formed by the exposed sidewall in the region of the tapering portion.

7. The evaporator burner arrangement according to claim 1, wherein the fuel evaporation surface is formed by an evaporator body from an absorbent, porous material.

8. The evaporator burner arrangement according to claim 7, wherein the evaporator body is arranged at an outer circumferential surface of the heat conductor body.

9. The evaporator burner arrangement according to claim 7, wherein a cover is provided at an end of the evaporator body facing the conversion region.

10. The evaporator burner arrangement according to claim 1, wherein a support air supply is provided for supplying a portion of the combustion air in a transition portion via which the mixture preparation region transitions into the conversion region.

11. The evaporator burner arrangement according to claim 1, wherein a transition portion via which the mixture preparation region transitions into the conversion region is provided with a variation in cross-section for improving the flow-off profile.

12. The evaporator burner arrangement according to claim 1, wherein the heat conductor body extends into the conversion region.

13. A mobile heater operated with liquid fuel having an evaporator burner arrangement according to claim 1.

14. The mobile heater operated with liquid fuel according to claim 13 which is formed as a vehicle heater for a parking heater or supplementary heater.

* * * * *

UNITED STATES PATENT AND TRADEMARK OFFICE
CERTIFICATE OF CORRECTION

PATENT NO. : 10,302,298 B2
APPLICATION NO. : 15/127306
DATED : May 28, 2019
INVENTOR(S) : Volodymyr Ilchenko et al.

It is certified that error appears in the above-identified patent and that said Letters Patent is hereby corrected as shown below:

On the Title Page

In The Abstract:

Item (57), Line 2, "fuel having" should be --fuel is described, having--.

In the Specification

Column 5, Line 59, "however - a per se" should be --however - in a per se--.

Column 8, Line 54, "between 00 and 900" should be --between 0° and 90°--.

Signed and Sealed this
Twentieth Day of August, 2019

Andrei Iancu
*Director of the United States Patent and Trademark Office*